(12) United States Patent
Hertel (10) Patent No.: US 11,267,048 B2
(45) Date of Patent: Mar. 8, 2022

(54) METHOD FOR ADDITIVELY MANUFACTURING AT LEAST ONE THREE-DIMENSIONAL OBJECT

(71) Applicant: CONCEPT LASER GMBH, Lichtenfels (DE)

(72) Inventor: Kai Hertel, Breitengüßbach (DE)

(73) Assignee: CONCEPT LASER GMBH, Lichtenfels (DE)

( * ) Notice: Subject to any disclaimer, the term of this patent is extended or adjusted under 35 U.S.C. 154(b) by 306 days.

(21) Appl. No.: 16/273,131

(22) Filed: Feb. 11, 2019

(65) Prior Publication Data
US 2019/0283134 A1   Sep. 19, 2019

(30) Foreign Application Priority Data
Mar. 14, 2018   (EP) ...................... 18161837

(51) Int. Cl.
*B22F 10/20*   (2021.01)
*B29C 64/153*   (2017.01)
(Continued)

(52) U.S. Cl.
CPC ............ *B22F 10/20* (2021.01); *B29C 64/153* (2017.08); *B29C 64/364* (2017.08);
(Continued)

(58) Field of Classification Search
CPC .......... B22F 10/20; B22F 10/30; B22F 10/00; B29C 64/364; B29C 64/393;
(Continued)

(56) References Cited

U.S. PATENT DOCUMENTS 4,931,653 A * 6/1990 Hamm ................... G01T 1/2935
250/361 R
5,961,793 A * 10/1999 Ngan ..................... C23C 14/564
204/192.12
(Continued)

FOREIGN PATENT DOCUMENTS

CN   106623928 A * 5/2017
CN   206392863 U   8/2017
(Continued)

OTHER PUBLICATIONS

Combined Chinese Search Report and Office Action Corresponding to Application No. 201910131632 dated Oct. 13, 2020.
(Continued)

*Primary Examiner* — Thomas C Lee
*Assistant Examiner* — Michael Tang
(74) *Attorney, Agent, or Firm* — Dority & Manning, P.A.

(57) ABSTRACT

Method for additively manufacturing at least one three-dimensional object, whereby a process gas stream streams across the build plane (BP), whereby the process gas stream is adapted to transport respective fume particles from a layer of build material (3) which are generated during selective irradiation and consolidation of the respective layer of build material (3); wherein it is determined that the process gas stream fulfils a pre-definable or pre-defined scheduling criterion; wherein the start time for starting irradiating and consolidating of a first area (A1) and/or the start time for starting irradiating and consolidating the at least one further area (A2, An) is determined on the basis of the determination that the process gas stream has fulfilled the pre-definable or pre-defined scheduling criterion.

20 Claims, 4 Drawing Sheets

(51) Int. Cl.
*B29C 64/364* (2017.01)
*B33Y 40/00* (2020.01)
*B29C 64/393* (2017.01)
*B33Y 10/00* (2015.01)
*B33Y 30/00* (2015.01)
*B33Y 50/02* (2015.01)
*B23K 26/342* (2014.01)
*B29C 64/386* (2017.01)
*B22F 10/30* (2021.01)

(52) U.S. Cl.
CPC ............ *B29C 64/393* (2017.08); *B33Y 40/00* (2014.12); *B22F 10/30* (2021.01); *B23K 26/342* (2015.10); *B29C 64/386* (2017.08); *B33Y 10/00* (2014.12); *B33Y 30/00* (2014.12); *B33Y 50/02* (2014.12)

(58) Field of Classification Search
CPC ..... B29C 64/153; B29C 64/386; B33Y 40/00; B33Y 10/00; B33Y 30/00; B33Y 50/02; B23K 26/342; B28B 1/001
See application file for complete search history.

(56) References Cited

U.S. PATENT DOCUMENTS

| | | | |
|---|---|---|---|
| 9,073,264 B2 | 7/2015 | Abe et al. | |
| 10,335,854 B2 | 7/2019 | Wiesner et al. | |
| 10,493,562 B2 | 12/2019 | Dimter et al. | |
| 2002/0053353 A1* | 5/2002 | Kawata | B08B 7/0035 134/1.3 |
| 2014/0271965 A1* | 9/2014 | Ferrar | B29C 64/182 425/163 |
| 2015/0107617 A1* | 4/2015 | Lee | G03F 1/82 134/1 |
| 2016/0279706 A1* | 9/2016 | Domrose | B33Y 10/00 |
| 2018/0043432 A1* | 2/2018 | Domrose | B29C 64/153 |
| 2018/0065126 A1* | 3/2018 | Abate | B03C 3/68 |
| 2018/0126650 A1* | 5/2018 | Murphree | B29C 64/371 |
| 2018/0178284 A1* | 6/2018 | Martin | B23K 26/0604 |
| 2018/0178287 A1* | 6/2018 | Mamrak | B29C 64/153 |
| 2018/0185961 A1* | 7/2018 | Meidani | B23K 26/1462 |
| 2018/0186082 A1* | 7/2018 | Randhawa | B22F 10/20 |
| 2018/0215095 A1 | 8/2018 | Amaya et al. | |
| 2018/0369961 A1* | 12/2018 | Ishikawa | B33Y 40/00 |
| 2019/0022946 A1* | 1/2019 | Jones | B33Y 30/00 |
| 2019/0134707 A1* | 5/2019 | Kaneko | B23K 26/1476 |
| 2020/0230944 A1* | 7/2020 | Ferrar | B22F 10/20 |

FOREIGN PATENT DOCUMENTS

| | | |
|---|---|---|
| DE | 102013205724 A1 | 10/2014 |
| DE | 102014212100 A1 | 12/2015 |
| EP | 3050666 A1 | 8/2016 |
| EP | 3272505 A1 | 1/2018 |
| EP | 3292927 A1 | 3/2018 |
| JP | 2014/201068 A | 10/2014 |
| JP | 2016/516886 A | 6/2016 |
| JP | 2016/517357 A | 6/2016 |
| JP | 2016/216773 A | 12/2016 |
| JP | 2017/164980 A | 9/2017 |
| WO | WO2017/208362 A1 | 12/2017 |

OTHER PUBLICATIONS

European Search Report Corresponding to Application No. 18161837 dated Aug. 29, 2018.
Machine Translated Japanese office Action Corresponding to Application No. 20190265545 dated Feb. 17, 2020.
Machine Translated Japanese Search Report Corresponding to Application No. 2019026545 dated Jan. 29, 2020.

* cited by examiner

METHOD FOR ADDITIVELY MANUFACTURING AT LEAST ONE THREE-DIMENSIONAL OBJECT

CROSS-REFERENCE TO RELATED APPLICATIONS

This application claims priority to European Patent Application serial no. 18 161 837.2 filed Mar. 14, 2018, the contents of which is incorporated herein by reference in its entirety as if set forth verbatim.

The invention relates to a method for additively manufacturing at least one three-dimensional object by means of successive layerwise selective irradiation and consolidation of layers of build material applied in a build plane of an apparatus for additively manufacturing three-dimensional objects by means of at least one energy beam, whereby a process gas stream being capable of being charged with fume particles generated during selective irradiation and consolidation of respective layers of build material streams across the build plane, whereby the process gas stream is adapted to remove or transport respective particles from a layer of build material which are generated during selective irradiation and consolidation of the respective layer of build material.

Respective methods for additively manufacturing at least one three-dimensional object, which may be implemented as selective electron beam melting processes or selective laser melting processes, for instance, are generally known from the technical field of additive manufacturing.

Thereby, it is known that a process gas stream being capable of being charged with fume, smoke, steam or soot particles generated during selective irradiation and consolidation of respective layers of build material streams across the build plane. The process gas stream serves for transporting respective fume, smoke, steam or soot particles from respective areas of the build plane which are selectively irradiated and consolidated.

One aim of further developing respective additive manufacturing methods is the aspect of reducing build times by finding improved approaches for scheduling the start time(s) for selectively irradiating and consolidating respective layers of build material.

In this regard, one has to consider diverse process parameters which may influence, i.e. in particular negatively affect, each other. One exemplary process parameter which has to be considered for improving scheduling the start time(s) is the streaming behavior of a respective process gas stream which streams across the build plane.

Hence, improving scheduling the start time(s) for selectively irradiating and consolidating respective layers of build material is challenging.

It is the object of the invention to provide a method for additively manufacturing at least one three-dimensional object allowing for an improved scheduling of start times for selectively irradiating and consolidating respective layers of build material.

This object is achieved by a method according to Claim 1. The claims depending on Claim 1 relate to possible embodiments of the method according to Claim 1.

The method described herein is a method for additively manufacturing at least one three-dimensional object, e.g. a technical component, by means of successive layerwise selective irradiation and consolidation of layers of build material, e.g. a ceramic, metal, or polymer build material, by means of at least one energy beam, e.g. a laser or electron beam. The layers of build material which are to be selectively irradiated and consolidated are applied in a build plane of an apparatus for additively manufacturing at least one three-dimensional object which is used for performing the method. The method is thus, performed by an apparatus for additively manufacturing at least one three-dimensional object.

The method may be a selective laser sintering method, a selective laser melting method, or a selective electron beam melting method, for instance. Yet, it is also conceivable that the method is a binder jetting method, particularly a metal binder jetting method, for instance. The apparatus for performing the method may be a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

The method may be implemented with a single energy beam or a plurality of energy beams. In other words, at least one or at least two energy beams may be used for selectively irradiating and consolidating respective layers of build material which are to be selectively irradiated and consolidated.

While performing the method, i.e. during selective irradiation and consolidation of respective layers of build material, fume, smoke, steam or soot particles (hereinafter "particles") are generated. Respective particles typically, comprise non-consolidated particulate build material, i.e. particulate build material which was not consolidated during the selective irradiation of the respective layer of build material.

In order to remove or transport respective particles away from the build plane or a process chamber comprising the build plane, a process gas stream being chargeable or charged with respective particles is generated. The process gas stream thus, serves for removing or transporting respective particles away from the build plane or a process chamber comprising the build plane, respectively. The process gas stream typically, streams across the build plane in such a manner that it is chargeable or charged with respective particles so as to remove or transport respective particles away from the build plane or a process chamber comprising the build plane, respectively. In other words, a process gas stream being capable of being charged with particles generated during selective irradiation and consolidation of respective layers of build material streams across the build plane while implementing the method; the process gas stream is adapted to remove or transport respective particles from a layer of build material which are generated during selective irradiation and consolidation of the respective layer of build material.

The process gas stream is typically, a process gas stream of given, i.e. particularly (substantially) constant, streaming properties, such as streaming direction, streaming profile, particularly a (substantially) laminar streaming profile, streaming velocity, etc. Hence, a process gas stream of given, i.e. particularly (substantially) constant, streaming properties may be used for/while implementing the method. The process gas stream may be a unidirectional or a multi-directional, e.g. a radial, gas stream.

The process gas stream is typically, an inert process gas stream, i.e. a stream of an inert process gas, such as argon, carbon dioxide, nitrogen, for instance, or a mixture of different inert process gases, respectively. Hence, an inert process gas stream may be used for/while implementing the method.

The process gas stream is generated by a stream generating unit configured to generate a process gas stream being capable of being charged with particles generated during selective irradiation and consolidation of respective layers of build material while streaming across the build plane, whereby the process gas stream is adapted to remove or transport respective particles from a layer of build material which are generated during selective irradiation and consolidation of the respective layer of build material. The stream generating unit is typically, connected to a process gas inlet of the process chamber through which the process gas stream may enter the process chamber. The stream generating unit may be built as or comprise a blowing and/or sucking unit, for instance.

The selective irradiation and consolidation of a respective layer of build material which is to be selectively irradiated and consolidated may comprise irradiating and consolidating at least two areas of the respective layer. In other words, a respective layer of build material which is to be selectively irradiated and consolidated may comprise at least two areas, i.e. a first area and at least one further area, which are to be irradiated and consolidated. The first area is typically, yet not necessarily, the area which is to be irradiated first.

As mentioned above, one or at least two energy beams may be used for selectively irradiating and consolidating a respective layer of build material. Hence, with regard to respective areas of a respective layer of build material which are to be irradiated and consolidated, each area may be irradiated by a (single) energy beam or by a plurality of energy beams.

Respective areas which are to be irradiated and consolidated may (directly) contact each other. Respective areas may thus, have at least one contact region, i.e. at least one contact point, in which a first area contacts at least one further area. Respective areas which do (directly) contact each other may be partial-areas or sub-areas of a superordinate area of the respective layer of build material which is to be selectively irradiated and consolidated. Respective areas which do (directly) contact each other may be assigned to a common three-dimensional object which is to be additively built by implementing the method or to different objects which are to be additively built by implementing the method.

Yet, it is also possible that respective areas which are to be irradiated and consolidated may not (directly) contact each other. Respective areas may thus, have no contact region, i.e. no contact point, in which a first area contacts at least one further area. Respective areas which do not (directly) contact each other are typically, spatially separated from each other. Respective areas which do not (directly) contact each other may also be partial-areas or sub-areas of a superordinate area of the respective layer of build material which is to be selectively irradiated and consolidated. Respective areas which do not (directly) contact each other may also be assigned to a common three-dimensional object which is to be additively built by implementing the method or to different objects which are to be additively built by implementing the method.

At least one respective area which is to be irradiated and consolidated may have a two-dimensional extension, i.e. may extend in two different spatial directions. Thus, a respective area which is to be irradiated and consolidated may comprise a plurality of irradiation vectors, particularly a plurality of scanning vectors. Hence, a plurality of irradiation vectors may form and thus, also be deemed as a respective area which is to be irradiated and consolidated. Yet, it is also possible that at least one respective area which is to be irradiated and consolidated may have a one-dimensional extension, i.e. may (substantially) extend in (only) one spatial direction. Thus, a respective area which is to be irradiated and consolidated may comprise only one irradiation vector, particularly a scanning vector. Hence, a (single) irradiation vector may also form and thus, be deemed as a respective area which is to be irradiated and consolidated. In either case, the geometric properties, i.e. particularly the shape and/or size, of respective areas which are to be irradiated and consolidated may be equal or differ.

According to the method, for at least one respective layer of build material which comprises at least two areas which are to be irradiated and consolidated, i.e. a first area and at least one further area which is to be irradiated and consolidated, it is determined if/that the process gas stream being chargeable or charged with particles generatable or generated during irradiation and consolidation of at least one of the areas which are to be irradiated and consolidated fulfils a pre-definable or pre-defined scheduling criterion. The scheduling criterion typically, considers the positions of the areas of a respective build material layer which are to be selectively irradiated and consolidated relative to the process gas stream, i.e. particularly relative to the streaming direction of the process gas stream. The method thus, comprises a first determination step ("scheduling criterion check step") in which it is determined if/that the process gas stream fulfils a pre-definable or pre-defined scheduling criterion (examples of which are given below). The first determination step thus, comprises determining if/that the process gas stream, i.e. particularly the part of the process gas stream which is charged with particles generated during selective irradiation of at least one area, fulfils the pre-definable or pre-defined scheduling criterion. The result of the first determination step is thus, an information which indicates if/that the process gas stream, i.e. particularly the part of the process gas stream which is charged with particles, fulfils the pre-definable or pre-defined scheduling criterion.

The first determination step may be performed by a hard- and/or software embodied first determination unit which is configured to determine if/that the process gas stream being chargeable or charged with particles generatable or generated during irradiation and consolidation of at least one of the areas which are to be irradiated and consolidated fulfils a pre-definable or pre-defined scheduling criterion. A respective determination unit may comprise at least one determination algorithm suitable for determining if/that the process gas stream fulfils the pre-definable or pre-defined scheduling criterion.

As will be apparent from below, the first determination step may be performed before starting selectively irradiating and consolidating the respective layer of build material, i.e. before starting irradiating and consolidating at least one area of the respective layer of build material which is to be selectively irradiated and consolidated, or even after starting selectively irradiating and consolidating the respective layer of build material, i.e. after starting irradiating and consolidating at least one area of the respective layer of build material which is to be selectively irradiated and consolidated.

According to the method, the start time for starting irradiating and consolidating of the first area and/or the start time for starting irradiating and consolidating the at least one further area is determined on basis of the determination if/that the process gas stream has fulfilled the pre-definable or pre-defined scheduling criterion. The method thus, comprises a second determination step ("scheduling step") in which the start time for starting irradiating and consolidating of the first area and/or the start time for starting irradiating and consolidating the at least one further area is determined on basis of the determination if/that the process gas stream has fulfilled the pre-definable or pre-defined scheduling criterion. The second determination step thus, comprises determining the start times for starting irradiating and consolidating the respective areas which are to be irradiated and consolidated in the respective layer of build material the on basis of the result of the first determination step, i.e. the information which indicates if/that the process gas stream fulfils the pre-definable or pre-defined scheduling criterion. The second determination step is thus, performed on basis of the result of the first determination step. The second determination step may comprise determining the order or sequence of start times for starting irradiating and consolidating of the first area and/or the at least one further area and thus, the order or sequence of irradiating and consolidating of the first area and/or the at least one further area. The second determination step may also comprise determining, i.e. particularly setting, a specific delay for irradiating and consolidating a further area after a first area has been irradiated and consolidated.

The second determination step may be performed by a hard- and/or software embodied second determination unit which is configured to determine the start time for starting irradiating and consolidating of the first area and/or the start time for starting irradiating and consolidating the at least one further area on basis of the determination that the process gas stream has fulfilled the pre-definable or pre-defined scheduling criterion. A respective second determination unit may comprise at least one determination algorithm suitable for determining the start times for starting irradiating and consolidating the respective areas which are to irradiated and consolidated in the respective layer of build material.

The first and second determination units may form part of a superordinate determination unit or control unit, respectively. As will be apparent from below, a respective control unit may be assignable or assigned to an apparatus for additively manufacturing three-dimensional objects.

The method thus, comprises providing at least one pre-definable or pre-defined scheduling criterion, determining if/that the process gas stream fulfils the respective scheduling criterion, and determining, i.e. particularly scheduling, the start times for starting irradiating and consolidating the at least two areas on basis of the determination if/that the process gas stream has fulfilled the pre-definable or pre-defined scheduling criterion. The method thus, considers the streaming behavior of a respective process gas stream which streams across the build plane and its potential influence on the irradiation and consolidation of respective areas which are to be irradiated and consolidated of a respective layer of build material which comprises at least two areas which are to be irradiated and consolidated. This allows for an improved scheduling of start times for irradiating and consolidating respective areas of a respective layer of build material which comprises at least two areas which are to be irradiated and consolidated.

After the start times have been determined for the respective areas, the irradiation and consolidation of the respective areas and thus, the respective layer of build material which comprises the respective areas can be carried out. The method may thus, comprise the step of irradiating and consolidating the respective areas of the respective layer of build material by means of at least one energy beam on basis of the determined start times for starting irradiating and consolidating the respective areas of the respective layer of build material.

If at least two energy beams and thus, at least two irradiation units, each being configured to selectively irradiate and thereby, consolidate areas of a layer of build material with at least one energy beam, are used, the method may further comprise assigning respective irradiation units to respective areas which are to be irradiated and consolidated under consideration of the scheduling criterion. Hence, the scheduling criterion may also be used for assigning irradiation units to respective areas of a build material layer which are to be irradiated and consolidated.

All steps of the method may be performed (fully) automatically.

According to an exemplary embodiment of the method, the scheduling criterion is a time criterion. As will be apparent from below, the scheduling criterion may thus, refer to a specific time or time interval. The time criterion is typically, fulfilled when the specific time or time interval has passed.

Thus, for the at least one layer of build material which comprises a first area which is to be irradiated and consolidated and at least one further area which is to be irradiated and consolidated, the time the process gas stream being chargeable or charged with particles generatable or generated during irradiation and consolidation of at least one of the areas which are to be irradiated and consolidated, e.g. a first area, takes to fulfil the time criterion may be determined. The start time for starting irradiating and consolidating of the first area and/or the start time for starting irradiating and consolidating the at least one further area may be determined on the basis of the determination that the process gas stream has fulfilled the time criterion. In other words, the start time for starting irradiating and consolidating of the first area and/or the start time for starting irradiating and consolidating of the at least one further area may be determined on basis of the determined time the process gas stream takes to fulfil the time criterion.

The time criterion may particularly, be or refer to the time the process gas stream being generated during irradiation and consolidation of the first area takes to transport the particles to a specific area in a process chamber comprising the build plane, particularly a specific area in, above, or over the build plane. The time criterion may thus, be fulfilled when the process gas stream has transported the particles to or over the specific area in the process chamber comprising the build plane, particularly to or over a specific area in the build plane. In such a manner, it can be assured that the particles generated during irradiation and consolidation of the first area cannot influence, i.e. negatively affect, the irradiation and consolidation of the at least one further area, e.g. by interactions with the at least one energy beam used for irradiating and consolidating the at least one further area, since the particles generated during irradiation and consolidation of the first area have been transported to or over the specific area in the process chamber comprising the build plane, particularly to or over the specific area in the build plane. The specific area typically, may be or refer to an area located behind the at least one further area which is to be irradiated and consolidated in the respective layer of build material for a given streaming direction of the process gas stream, for instance.

As such, the time criterion may particularly, be or refer to the time the process gas stream takes to transport the particles generated during irradiation and consolidation of the first area across the at least one further area of the respective layer of build material which is to be selectively irradiated and consolidated. The time criterion may thus, be fulfilled when the process gas stream has transported the particles generated during irradiation and consolidation of the first area across the at least one further area. In such a manner, it can be assured that the particles generated during irradiation and consolidation of the first area cannot influence, i.e. negatively affect, the irradiation and consolidation of the at least one further area since the particles generated during irradiation and consolidation of the first area have (already) been transported across the at least one further area.

As such, the time criterion may also particularly, be or refer to the time the process gas stream takes to transport the particles generated during irradiation and consolidation of the first area out of the process chamber comprising the build plane. The time criterion may thus, be fulfilled when the process gas stream has transported the particles generated during irradiation and consolidation of the first area out of the process chamber comprising the build plane. In such a manner, it can be assured that the particles generated during irradiation and consolidation of the first area cannot influence, i.e. negatively affect, the irradiation and consolidation of the at least one further area since the particles generated during irradiation and consolidation of the first area have (already) been transported out of the process chamber comprising the build plane.

Alternatively or additionally to a time criterion, the scheduling criterion may be a local criterion. As will be apparent from below, the scheduling criterion may thus, refer to a specific location, particularly a specific location in the build plane or a process chamber comprising the build plane, respectively. The local criterion is typically, fulfilled when the process gas stream reaches, has reached, crosses or has crossed a specific location in the build plane or a process chamber comprising the build plane, respectively. This is generally, independent of the time the process gas stream takes to reach or cross the specific location.

Thus, for the at least one layer of build material which comprises a first area which is to be irradiated and consolidated and the at least one further area which is to be irradiated and consolidated, it may be determined that the process gas stream being chargeable or charged with particles generatable or generated during irradiation and consolidation of at least one of the areas which are to be irradiated and consolidated has fulfilled the local criterion. The start time for starting irradiating and consolidating of the first area and/or the start time for starting irradiating and consolidating the at least one further area may be determined on basis of the determination that the process gas stream has fulfilled the local criterion.

As such, the local criterion may be or refer to a specific area in a process chamber comprising the build plane, particularly a specific area in the build plane. The local criterion may thus, be fulfilled when the process gas stream reaches or has reached or crosses or has crossed the specific area or over the specific area in the process chamber comprising the build plane, particularly the specific area of the build plane. In such a manner, it can be assured that the particles generated during irradiation and consolidation of the first area cannot influence, i.e. negatively affect, the irradiation and consolidation of the at least one further area, e.g. by interactions with the at least one energy beam used for irradiating and consolidating the at least one further area, since the particles generated during irradiation and consolidation of the first area have (already) reached or crossed the specific area or over the specific area in the process chamber comprising the build plane, particularly the specific area of the build plane. The specific area may be or refer to an area located behind the at least one further area which is to be irradiated and consolidated in the respective layer of build material for a given streaming direction of the process gas stream, for instance.

Generally, the start time for irradiating and consolidating the at least one further area which is to be irradiated and consolidated may be determined as the time point when the process gas stream has fulfilled the pre-definable or pre-defined scheduling criterion. This applies both to the exemplary embodiment in which the scheduling criterion is or refers to a time criterion and to the exemplary embodiment in which the scheduling criterion is or refers to a local criterion.

It may generally, apply that in either case a pre-definable of pre-defined minimum time interval, e.g. one second, is waited before the at least one further area is irradiated and consolidated after irradiating and consolidating a first area has started. In such a manner, it can be assured that there is no undesired influence of irradiating the at least one further area due to irradiating a first area.

The method may further comprise determining if the at least two areas which are to be irradiated and consolidated are located in a spatial relation relative to each other such that the process gas stream transports the particles generated during irradiation and consolidation of a first area across at least one further area. Hence, the method may comprise a determination step in which it is determined if/that the at least two areas are located in a spatial relation relative to each other such that the process gas stream transports the particles generated during irradiation and consolidation of a first area across at least one further area. In other words, it may be determined if there is a general possibility that irradiating the first area or the particles generated during irradiation of a first area, respectively may influence irradiating at least one further area. If it is determined that the at least two areas are located in a spatial relation relative to each other such that the process gas stream does not transport the particles generated during irradiation and consolidation of a first area across at least one further area, the first area and the at least one further area may be at least partly irradiated simultaneously. This determination step may be performed before, simultaneously or after the above first and/or second determination step(s).

The determination step may be performed by a hard- and/or software embodied determination unit which is configured to determine if/that the at least two areas are located in a spatial relation relative to each other such that the process gas stream transports the particles generated during irradiation and consolidation of a first area across at least one further area. A respective determination unit may comprise at least one determination algorithm suitable for determining if/that the at least two areas which are to be irradiated and consolidated are located in a spatial relation relative to each other such that the process gas stream transports the particles generated during irradiation and consolidation of a first area across at least one further area.

The streaming of a process gas stream, particularly a process gas stream of given streaming properties, in the process chamber comprising the build plane, i.e. particularly the streaming of the process gas stream across the build plane, may be simulated. Hence, the determination that the process gas stream fulfils or has fulfilled the scheduling criterion may be determined on basis of a simulation, particularly a simulation of the process gas stream being charged with particles generated during irradiation and consolidation of a first area and/or at least one further area which is to be irradiated and consolidated. The method may thus, comprise a simulation step in which the streaming of the process gas stream being charged with particles generated during irradiation and consolidation of a first area and/or at least one further area which is to be irradiated and consolidated in the process chamber comprising the build plane, i.e. particularly the streaming of the process gas stream across the build plane, may be simulated before it actually takes place. The simulation may consider diverse process parameters, such as energy beam parameters, such as energy input or energy input-related parameters, e.g. beam intensity, beam focus size, etc., and/or build material parameters, such as type of build material, size of build material particles, etc.

The simulation step may be performed by a hard- and/or software embodied simulation unit which is configured to simulate the streaming of the process gas stream being charged with particles generated during irradiation and consolidation of a first area and/or at least one further area which is to be irradiated and consolidated in the process chamber comprising the build plane, i.e. particularly the streaming of the process gas stream across the build plane. A respective simulation unit may comprise at least one simulation algorithm suitable for simulating the streaming of the process gas stream being charged with particles generated during irradiation and consolidation of a first area and/or at least one further area which is to be irradiated and consolidated in the process chamber comprising the build plane.

It is generally open which of the at least two areas which are to be irradiated and consolidated of the respective layer of build material are to be determined as the first area and/or the at least one further area, respectively. As mentioned above, the first area is typically, yet not necessarily, the area which is to be irradiated first. Determining a respective area as the area which is irradiated and consolidated first may be performed on basis of their (spatial) extension, orientation and/or position in the build plane, for example. Yet, other principles of determining that a respective area is to be irradiated and consolidated first are conceivable. For example, the area which is to be irradiated and consolidated first may be determined on basis of a current configuration, i.e. particularly a spatial orientation relative to the build plane, of at least one beam deflection element, e.g. a scanning element, of a beam deflecting unit, e.g. a scanning unit. Using the current configuration of the beam deflection elements of a beam deflecting unit for determining which area is to be irradiated and consolidated first, may further improve determining the start times for starting irradiating and consolidating respective areas.

If at least two energy beams and thus, at least two irradiation units, each being configured to selectively irradiate and thereby, consolidate areas of a layer of build material with at least one energy beam, are used, the method may further comprise considering a mobility criterion which relates to the maximum coverage of the build plane which can be covered by a respective irradiation unit. The maximum coverage of a respective irradiation unit is typically, defined by the mobility of respective beam deflection elements of a beam deflecting unit, e.g. a scanning unit, configured to deflect an energy beam to diverse positions within the build plane of the apparatus, forming part of the respective irradiation unit.

The invention further relates to a hard- and/or software embodied control unit for an apparatus for additively manufacturing at least one three-dimensional object by means of successive layerwise selective irradiation and consolidation of layers of build material applied in the build plane of a respective apparatus by means of at least one energy beam. The control unit is configured to, particularly in accordance with the method as described herein, determine for at least one layer of build material which comprises a first area which is to be irradiated and consolidated and at least one further area which is to be irradiated and consolidated, that a process gas stream being charged with particles generated during irradiation and consolidation of at least one of the areas which are to be irradiated and consolidated fulfils a pre-definable or pre-defined scheduling criterion, and determine the start time for starting irradiating and consolidating of the first area and/or the start time for starting irradiating and consolidating the at least one further area is determined on basis of the determination that the process gas stream has fulfilled the pre-definable or pre-defined scheduling criterion.

The control unit may comprise or be connected with the respective units, i.e. particularly the first and second determination units, used for implementing the method described herein.

The invention further relates to an apparatus for additively manufacturing at least one three-dimensional object by means of successive layerwise selective irradiation and consolidation of layers of build material applied in the build plane of the apparatus by means of at least one energy beam. The apparatus comprises or is connected with at least one control unit as specified herein.

The apparatus can be a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

The apparatus comprises a number of functional and/or structural units which are operable or operated during its operation. Each functional and/or structural unit may comprise a number of functional and/or structural sub-units. Exemplary functional and/or structural units are a build material application unit which is configured to apply an amount of build material which is to be selectively irradiated and consolidated in the build plane of the apparatus, an irradiation unit which is configured to selectively irradiate and thereby, consolidate areas of a layer of build material with at least one energy beam, a stream generating unit configured to generate a process gas stream being capable of being charged with particles generated during selective irradiation and consolidation of respective layers of build material while streaming across the build plane, whereby the process gas stream is adapted to remove or transport respective particles from a layer of build material which are generated during selective irradiation and consolidation of the respective layer of build material, and a respective control unit.

All annotations regarding the method also apply to the control unit and/or the apparatus.

Exemplary embodiments of the invention are described with reference to the Fig., whereby.

Figure 1:
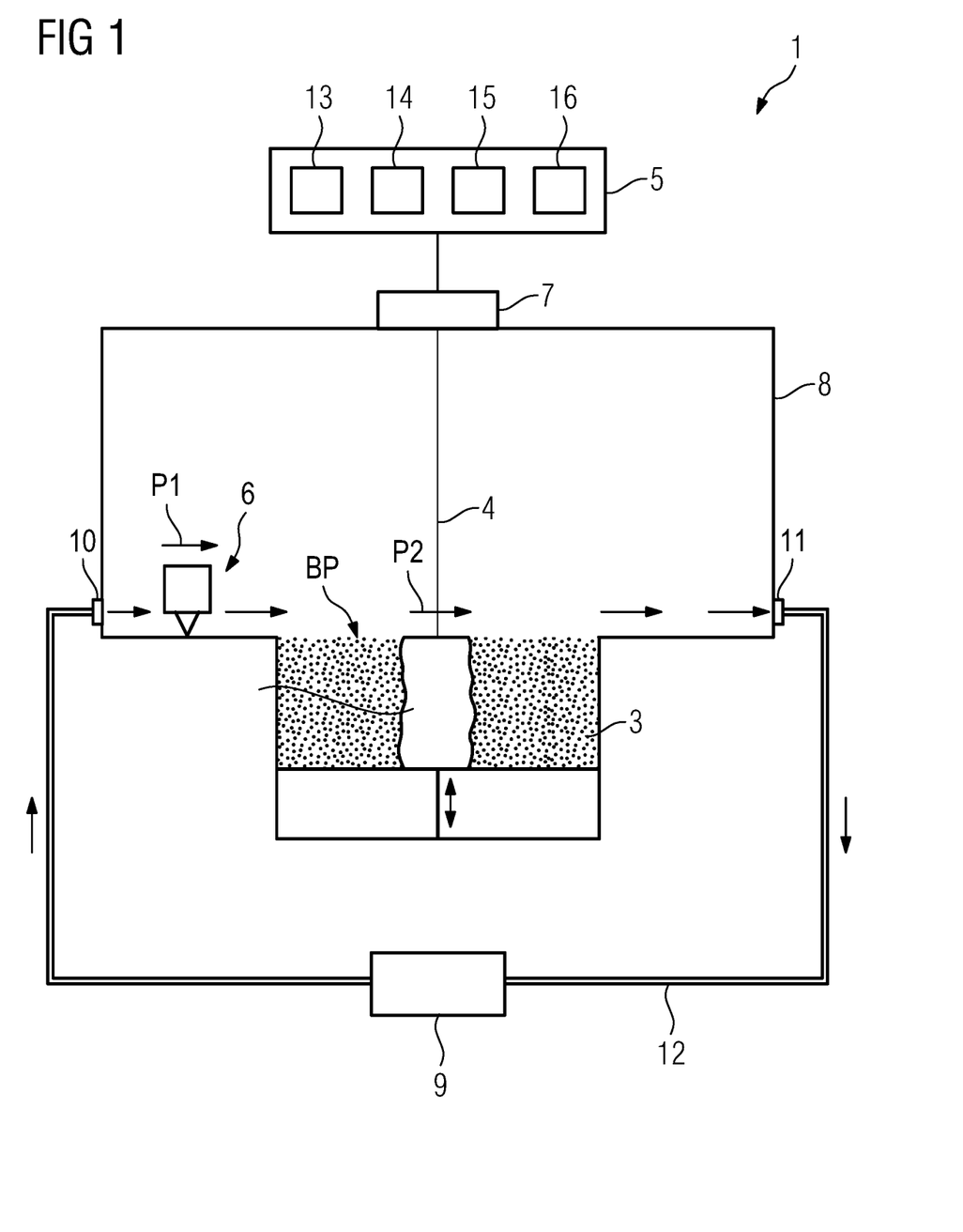
FIG. 1 shows a principle drawing of an apparatus for additively manufacturing of three-dimensional objects according to an exemplary embodiment.

FIG. 1 shows a principle drawing of an exemplary embodiment of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of at least one energy beam 4 according to an exemplary embodiment. The energy beam 4 may be an electron beam or a laser beam, for instance. The apparatus 1 may thus, be embodied as a selective electron beam melting apparatus or as a selective laser melting apparatus, for instance.

The apparatus 1 comprises a number of functional and/or structural units which are operable and operated during its operation. Each functional and/or structural unit may comprise a number of functional and/or structural sub-units. Operation of the functional and/or structural units and the apparatus 1, respectively is controlled by a (central) control unit 5.

Exemplary functional and/or structural units of the apparatus 1 are a build material application unit 6, an irradiation unit 7 and a stream generating unit 9.

The build material application unit 6 is configured to apply an amount of build material 3 in the build plane BP of the apparatus 1 so as to generate respective layers of build material 3 which are to be selectively irradiated and consolidated during additively manufacturing a three-dimensional object 2 by means of the apparatus 1. The build material application unit 6 may be embodied as a re-coating unit, for instance. The build material application unit 6 is moveably supported within the process chamber 8 of the apparatus 1; the build material application unit 6 may be moved across the build plane BP of the apparatus 1 so as to apply an amount of dosed build material 3 in the build plane BP of the apparatus 1 and generate a respective layer of build material 3 which is to be selectively irradiated and consolidated during additively manufacturing a three-dimensional object 2 by means of the apparatus 1. An exemplary motion of the build material application unit 6 is indicated by arrow P1, which represents an exemplary coating direction of the build material application unit 6.

The irradiation unit 7 is configured to selectively irradiate and thereby, consolidate respective layers of build material 3 which have been applied in the build plane BP of the apparatus 1 by means of the build material application unit 6 with at least one energy beam 4. The irradiation unit 6 may comprise a beam generating unit (not shown) configured to generate at least one energy beam 4 and a beam deflecting unit (not shown), e.g. a scanning unit, configured to deflect an energy beam 4 to diverse positions within the build plane BP of the apparatus 1.

The stream generating unit 9 is configured to generate a process gas stream (indicated by arrows P2) streaming across the build plane BP of the apparatus. The process gas stream enters the process chamber 8 at a process gas stream inlet 10 and exits the process chamber 8 at a process gas outlet 11. The process gas stream inlet 10 and process gas outlet 11 are connected to the stream generating unit 9 by means of a streaming channel structure 12 comprising at least one streaming channel. The stream generating unit 9 may be built as or comprise a blowing and/or sucking unit, for instance.

The process gas stream is capable of being charged with fume, smoke, steam or soot particles generated during selective irradiation and consolidation of respective layers of build material 3 while streaming across the build plane BP. The process gas stream is thereby, adapted to remove or transport respective particles from a layer of build material 3 which are generated during selective irradiation and consolidation of the respective layer of build material 3.

Operation of the build material application unit 6, the irradiation unit 7, and the stream generating unit 9 may be controlled by the control unit 5.

The control unit 5 is configured to implement a method for additively manufacturing a three-dimensional object 2 by means of controlling operation of the respective functional and/or structural units of the apparatus 1.

While performing the method, i.e. during selective irradiation and consolidation of respective layers of build material 3, respective fume, smoke, steam or soot particles are generated. As indicated above, a process gas stream is generated so as to remove or transport respective particles away from the build plane BP or the process chamber 8, respectively. The process gas stream streams across the build plane BP in such a manner that it is chargeable or charged with respective particles so as to remove or transport respective particles away from the build plane or the process chamber 8, respectively.

The process gas stream has given, i.e. particularly (substantially) constant, streaming properties, such as streaming direction, streaming profile, particularly a (substantially) laminar streaming profile, streaming velocity, etc.

As is apparent from FIG. 2-7, each showing a top-view of the build plane BP of the apparatus 1 of FIG. 1 according to an exemplary embodiment, the selective irradiation and consolidation of a respective layer of build material 3 may comprise irradiating and consolidating at least two areas A1-An of the respective layer of build material 3. In other words, a respective layer of build material 3 which is to be selectively irradiated and consolidated may comprise at least two areas A1-An, i.e. a first area A1 and at least one further area, which are to be irradiated and consolidated. Each area A1-An may be irradiated by a (single) energy beam 4 or by a plurality of energy beams 4.

Figure 2:
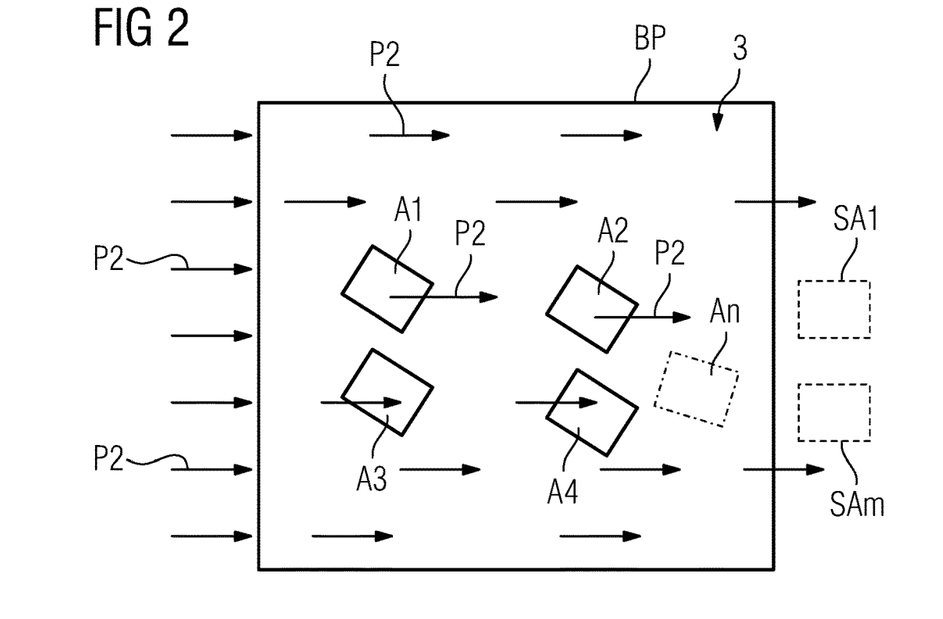
FIG. 2-7 each show a top-view of the build plane of the apparatus of FIG. 1 according to an exemplary embodiment.

FIG. 2 shows that respective areas A1-An (whereby n is an integer) may not (directly) contact each other. Respective areas A1-An may thus, have no contact region, i.e. no contact point, in which a first area A1 contacts at least one further area A2, An. Respective areas A1-An which do not (directly) contact each other are typically, spatially separated from each other. Respective areas which do not (directly) contact each other may be partial-areas or sub-areas of a superordinate area of the respective layer of build material 3 which is to be selectively irradiated and consolidated. Respective areas A1-An which do not (directly) contact each other may be assigned to a common three-dimensional object 2 which is to be additively built by implementing the method or to different objects 2 which are to be additively built by implementing the method.

Figure 3:
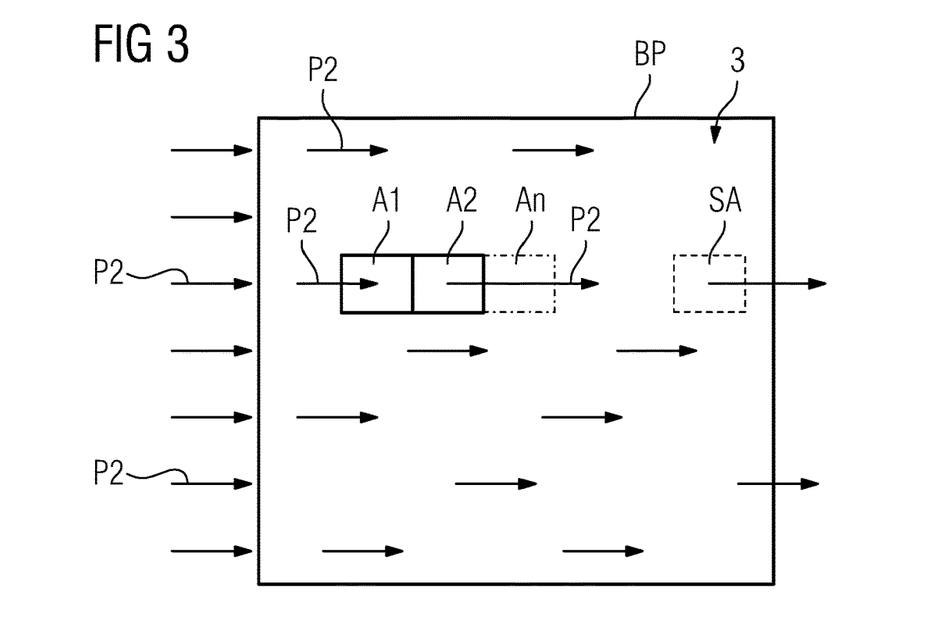
Figure 4:
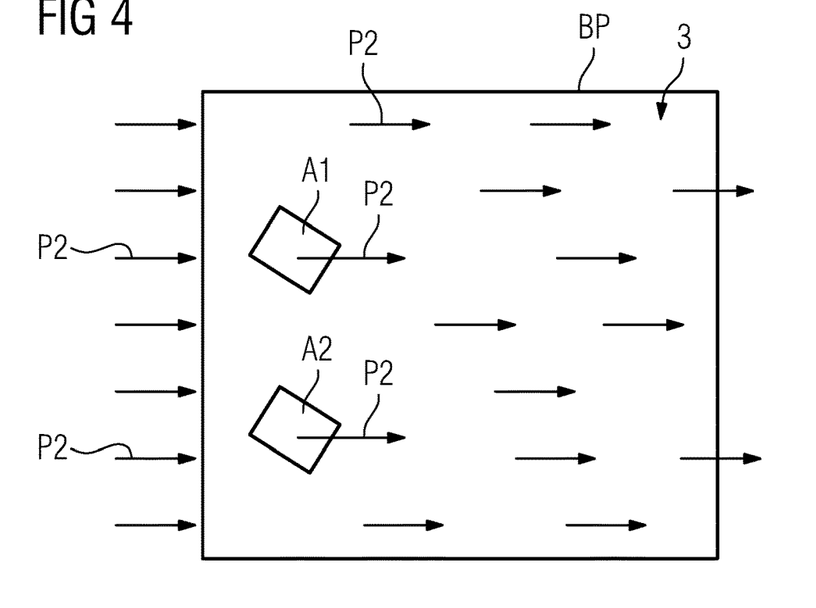
Figure 5:
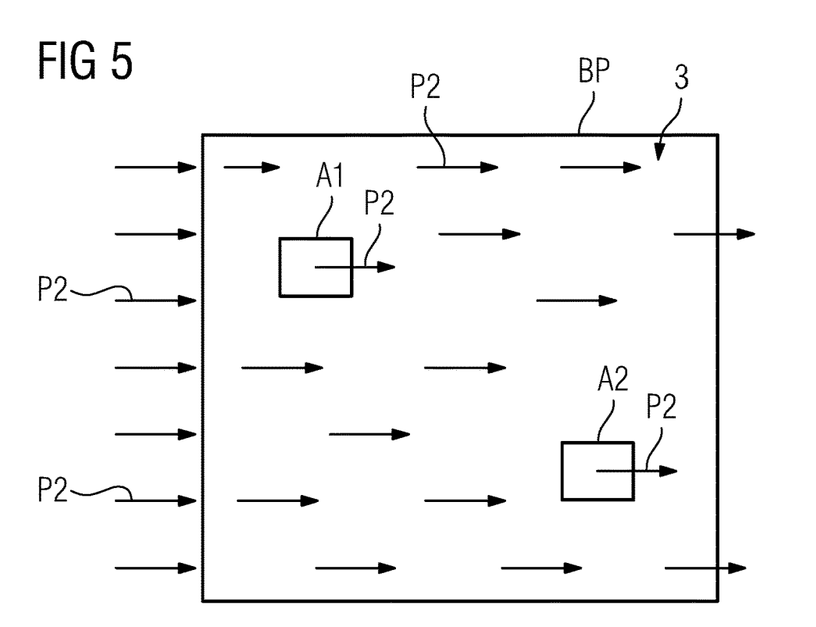

FIG. 3 shows that respective areas A1-An may also (directly) contact each other. Respective areas A1-An may thus, have at least one contact region, i.e. at least one contact point, in which a first area A1 contacts at least one further area A2, An. Respective areas A1-An which do (directly) contact each other may be partial-areas or sub-areas of a superordinate area of the respective layer of build material 3 which is to be selectively irradiated and consolidated. Respective areas A1-An which do (directly) contact each other may also be assigned to a common three-dimensional object 2 which is to be additively built by implementing the method or to different objects 2 which are to be additively built by implementing the method.

According to the exemplary embodiments of the Fig., respective areas A1-An each have a two-dimensional extension, i.e. extend in two different spatial directions. Thus, a respective area A1-An which is to be irradiated and consolidated may comprise a plurality of irradiation vectors, particularly scanning vectors. Yet, it is also possible that at least one respective area A1-An may have a one-dimensional extension, i.e. may (substantially) extend in (only) one spatial direction. Thus, a respective area which is to be irradiated and consolidated may comprise only one irradiation vector, particularly a scanning vector.

According to the method, it is determined for a respective layer of build material 3 which comprises at least two areas A1-An, which are to be irradiated and consolidated, if/that the process gas stream being chargeable or charged with particles generatable or generated during irradiation and consolidation of at least one of the areas A1-An fulfils a pre-definable or pre-defined scheduling criterion. The method thus, comprises a first determination step ("scheduling criterion check step") in which it is determined if/that the process gas stream fulfils a pre-definable or pre-defined scheduling criterion. The result of the first determination step is an information which indicates if/that the process gas stream fulfils the pre-definable or pre-defined scheduling criterion. It will be apparent from below, that the scheduling criterion is related to the locations of respective areas which are to be irradiated and consolidated relative to the direction (s) of the process gas stream.

The first determination step may be performed by a hard- and/or software embodied first determination unit 13 which is configured to determine if/that the process gas stream being chargeable or charged with particles generatable or generated during irradiation and consolidation of at least one of the areas A1-An fulfils a pre-definable or pre-defined scheduling criterion. The determination unit 13 may comprise at least one determination algorithm suitable for determining if/that the process gas stream fulfils the pre-definable or pre-defined scheduling criterion.

The first determination step may be performed before starting selectively irradiating and consolidating the respective layer of build material 3, i.e. before starting irradiating and consolidating at least one area A1-An of the respective layer of build material 3 which is to be selectively irradiated and consolidated, or even after starting selectively irradiating and consolidating the respective layer of build material 3, i.e. after starting irradiating and consolidating at least one area A1-An of the respective layer of build material 3 which is to be selectively irradiated and consolidated.

According to the method, the start time for starting irradiating and consolidating of the first area A1 and/or the at least one further area A2, An is determined on basis of the determination if/that the process gas stream has fulfilled the pre-definable or pre-defined scheduling criterion. The method thus, comprises a second determination step ("scheduling step") in which the start time for starting irradiating and consolidating of the first area A1 and/or the start time for starting irradiating and consolidating the at least one further area A2, An is determined on basis of the determination if/that the process gas stream has fulfilled the pre-definable or pre-defined scheduling criterion. The second determination step thus, comprises determining the start times for starting irradiating and consolidating the respective areas A1-An which are to be irradiated and consolidated in the respective layer of build material 3 on basis of the result of the first determination step, i.e. the information which indicates if/that the process gas stream fulfils the pre-definable or pre-defined scheduling criterion. The second determination step is thus, performed on basis of the result of the first determination step. The second determination step may comprise determining the order or sequence of start times for starting irradiating and consolidating of the first area A1 and/or the at least one further area A2, An and thus, the order or sequence of irradiating and consolidating of the first area A1 and/or the at least one further area A2, An.

The second determination step may be performed by a hard- and/or software embodied second determination unit 14 which is configured to determine the start time for starting irradiating and consolidating of the first area A1 and/or the start time for starting irradiating and consolidating the at least one further area A2, An on basis of the determination that the process gas stream has fulfilled the pre-definable or pre-defined scheduling criterion. The second determination unit 14 may comprise at least one determination algorithm suitable for determining the start times for starting irradiating and consolidating the respective areas A1-An which are to be irradiated and consolidated in the respective layer of build material 3.

The method thus, comprises providing at least one pre-definable or pre-defined scheduling criterion, determining if/that the process gas stream fulfils the respective scheduling criterion, and determining, i.e. particularly scheduling, the start times for starting irradiating and consolidating the respective areas A1-An on basis of the determination if/that the process gas stream has fulfilled the pre-definable or pre-defined scheduling criterion. The method thus, considers the streaming behavior of the process gas stream which streams across the build plane BP and its potential influence on the irradiation and consolidation of respective areas A1-An of a respective layer of build material 3 which comprises at least two areas A1-An which are to be irradiated and consolidated.

After the start times have been determined for the respective areas A1-An, the irradiation and consolidation of the respective areas A1-An and thus, the respective layer of build material 3 which comprises the respective areas A1-An can be carried out. The method thus, comprises the step of irradiating and consolidating the respective areas A1-An of the respective layer of build material 3 by means of at least one energy beam 4 on basis of the determined start times for starting irradiating and consolidating the respective areas A1-An.

The scheduling criterion may be a time criterion. The scheduling criterion may thus, refer to a specific time or time interval. The time criterion is typically, fulfilled when the specific time or time interval has passed.

Thus, for a respective layer of build material 3 the time the process gas stream being chargeable or charged with particles generatable or generated during irradiation and consolidation of at least one of the areas A1-An, e.g. the first area A1, takes to fulfil the time criterion may be determined. The start time for starting irradiating and consolidating of the first area A1 and/or the at least one further area A2, An may be determined on basis of the determination that the process gas stream has fulfilled the time criterion. In other words, the start time for starting irradiating and consolidating of the first area and/or the at least one further area A2, An may be determined on basis of the determined time the process gas stream takes to fulfil the time criterion.

The time criterion may particularly, be or refer to the time the process gas stream being generated during irradiation and consolidation of the first area A1 takes to transport the particles to a specific area SA, SAm (whereby m is an integer) in the process chamber 8 (see FIG. 2), particularly a specific area SA, SAm in, above, or over the build plane BP (see FIG. 3). The time criterion may thus, be fulfilled when the process gas stream has transported the particles to or over the specific area SA, SAm in the process chamber 8 or the build plane BP, respectively. As is apparent from FIG. 2, 3, the specific area SA, SAm may be or refer to an area located behind the at least one further area A2, An which is to be irradiated and consolidated in the respective layer of build material 3 for a given streaming direction (see arrows P2) of the process gas stream.

As such, the time criterion may particularly, be or refer to the time the process gas stream takes to transport the particles generated during irradiation and consolidation of the first area A1 across the at least one further area A2, An of the respective layer of build material 3. The time criterion may thus, be fulfilled when the process gas stream has transported the particles generated during irradiation and consolidation of the first area A1 across the at least one further area A2, An.

As such, the time criterion may also particularly, be or refer to the time the process gas stream takes to transport the particles generated during irradiation and consolidation of the first area A1 out of the process chamber 8. The time criterion may thus, be fulfilled when the process gas stream has transported the particles generated during irradiation and consolidation of the first area A1 out of the process chamber 8.

In either case, it can be assured that the particles generated during irradiation and consolidation of the first area A1 cannot influence, i.e. negatively affect, the irradiation and consolidation of the at least one further area A2, An, e.g. by interactions with the at least one energy beam 4 used for irradiating and consolidating the at least one further area A2, An.

Alternatively or additionally to a time criterion, the scheduling criterion may be a local criterion. The scheduling criterion may thus, refer to a specific location, particularly a specific location in the build plane or a process chamber comprising the build plane, respectively. The local criterion is typically, fulfilled when the process gas stream reaches, has reached, crosses or has crossed a specific location in the build plane or a process chamber comprising the build plane, respectively. This is generally, independent of the time the process gas stream takes to reach or cross the specific location. A respective specific location may be given by one of the specific areas SA1, SAm mentioned above, for instance.

Thus, for a respective layer of build material 3 it may be determined that the process gas stream being chargeable or charged with particles generatable or generated during irradiation and consolidation of at least one of the areas A1-An which are to be irradiated and consolidated has fulfilled the local criterion. The start time for starting irradiating and consolidating of the first area A1 and/or the start time for starting irradiating and consolidating the at least one further area A2, An may be determined on basis of the determination that the process gas stream has fulfilled the local criterion.

The local criterion may be or refer to a specific area SA, SAm in the process chamber 8 (see FIG. 2), particularly a specific area in the build plane BP (see FIG. 3). The local criterion may thus, be fulfilled when the process gas stream reaches or has reached or crosses or has crossed the specific area SA, SAm or over the specific area SA, SAm in the process chamber comprising 8 or in the build plane BP, respectively.

In such a manner, it can be assured that the particles generated during irradiation and consolidation of the first area A1 cannot influence, i.e. negatively affect, the irradiation and consolidation of the at least one further area A2, An, e.g. by interactions with the at least one energy beam 4 used for irradiating and consolidating the at least one further area A2, An, since the particles generated during irradiation and consolidation of the first area A1 have (already) reached or crossed the specific area SA, SAm in the process chamber 8 or in the build plane BP, respectively. As is apparent from FIG. 2, 3, the specific area SA, SAm may be or refer to an area located behind the at least one further area A2, An which is to be irradiated and consolidated in the respective layer of build material 3 for a given streaming direction (see arrows P2) of the process gas stream, for instance.

Generally, the start time for irradiating and consolidating the at least one further area A2, An may be determined as the time point when the process gas stream has fulfilled the pre-definable or pre-defined scheduling criterion. This applies both to the exemplary embodiment in which the scheduling criterion is or refers to a time criterion and to the exemplary embodiment in which the scheduling criterion is or refers to a local criterion.

It may generally, apply that in either case a pre-definable of pre-defined minimum time interval, e.g. one second, is waited before the at least one further area A2, An is irradiated and consolidated after irradiating and consolidating a first area A1 has started. In such a manner, it can be assured that there is no undesired influence of irradiating the at least one further area A2, An due to irradiating a first area A1.

The method may further comprise determining if the areas A1-An which are to be irradiated and consolidated are located in a spatial relation relative to each other such that the process gas stream transports the particles generated during irradiation and consolidation of a first area A1 across at least one further area A2, An. Hence, the method may comprise a determination step in which it is determined if/that the areas A1-An are located in a spatial relation relative to each other such that the process gas stream transports the particles generated during irradiation and consolidation of a first area A1 across at least one further area A2, An. In other words, it may be determined if there is a general possibility that irradiating a first area A1 or the particles generated during irradiation of a first area A1, respectively may influence irradiating the at least one further area A2, An. If it is determined that the areas A1-An are located in a spatial relation relative to each other such that the process gas stream does not transport the particles generated during irradiation and consolidation of a first area A1 across the at least one further area A2, An (see FIG. 4, 5), the first area A1 and the at least one further area A2, An may be at least partly irradiated simultaneously. This determination step may be performed before, simultaneously or after the above first and/or second determination step(s).

The determination step may be performed by a hard- and/or software embodied determination unit 15 (optional) which is configured to determine if/that the at least two areas A1-An are located in a spatial relation relative to each other such that the process gas stream transports the particles generated during irradiation and consolidation of a first area A1 across at least one further area A2, An. The determination unit 15 may comprise at least one determination algorithm suitable for determining if/that the at least two areas A1-An are located in a spatial relation relative to each other such that the process gas stream transports the particles generated during irradiation and consolidation of a first area A1 across at least one further area A2, An.

The streaming of the process gas stream may be simulated. Hence, the determination that the process gas stream fulfils or has fulfilled the scheduling criterion may be determined on basis of a simulation, particularly a simulation of the process gas stream being charged with particles generated during irradiation and consolidation of a first area A1 and/or at least one further area A2, An which is to be irradiated and consolidated. The method may thus, comprise a simulation step in which the streaming of the process gas stream being charged with particles generated during irradiation and consolidation of a first area A1 and/or at least one further area A2, An which is to be irradiated and consolidated in the process chamber 8, i.e. particularly across the build plane BP, may be simulated before it actually takes place. The simulation may consider diverse process parameters, such as energy beam parameters, such as energy input or energy input-related parameters, e.g. beam intensity, beam focus size, etc., and/or build material parameters, such as type of build material, size of build material particles, etc.

The simulation step may be performed by a hard- and/or software embodied simulation unit 16 (optional) which is configured to simulate the streaming of the process gas stream being charged with particles generated during irradiation and consolidation of a first area and/or at least one further area which is to be irradiated and consolidated in the process chamber 8, i.e. across the build plane BP. The simulation unit 16 may comprise at least one simulation algorithm suitable for simulating the streaming of the process gas stream being charged with particles generated during irradiation and consolidation of a first area A1 and/or at least one further area A2, An which is to be irradiated and consolidated in the process chamber 8.

It is generally open which of the at least two areas A1-An which are to be irradiated and consolidated of the respective layer of build material 3 are to be determined as the first area and/or the at least one further area, respectively. The first area A1 is typically, yet not necessarily, the area which is to be irradiated first. Determining a respective area as the first area A1 may be performed on basis of their (spatial) extension, orientation and/or position in the build plane BP, for example. Yet, other principles of determining that a respective area is the first area A1 are conceivable. For example, the first area A1 may be determined on basis of a current configuration, i.e. particularly a spatial orientation relative to the build plane BP, of at least one beam deflection element (not depicted), e.g. a scanning element (scanning mirror), of a beam deflecting unit, e.g. a scanning unit. Using the current configuration of the beam deflection elements of a beam deflecting unit for determining which area is to be irradiated and consolidated first, may further improve determining the start times for starting irradiating and consolidating respective areas A1-An.

FIG. 2-7 show exemplary arrangements of areas A1-An which are to be irradiated and consolidated. The exemplary arrangements of FIG. 2-4 and the corresponding scheduling of start times for irradiating and consolidating the areas A1-An have been explained above.

Figure 6:
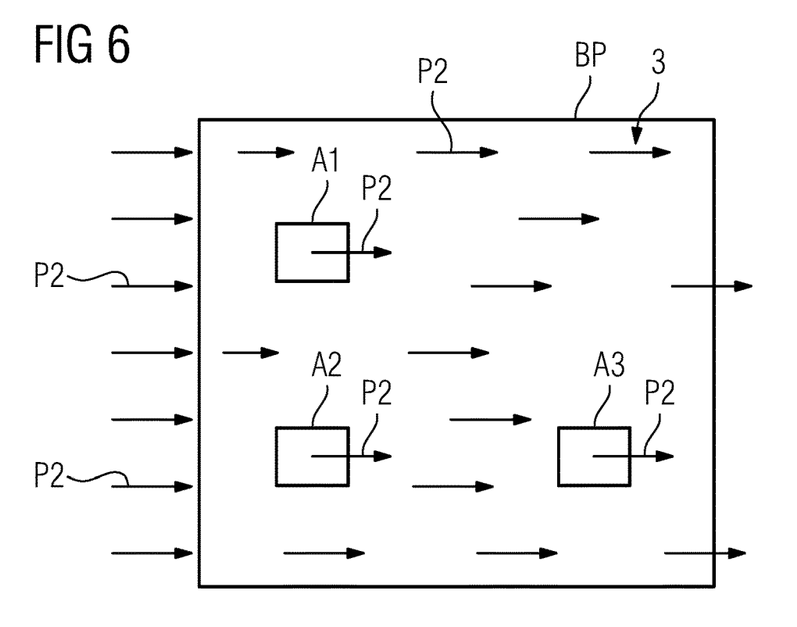

The exemplary arrangement of areas A1-A3 which are to be irradiated and consolidated according to FIG. 6 can result in a simultaneous irradiation of areas A1 and A2 and a subsequent irradiation of area A3. Also, area A3 could be simultaneously irradiated with area A1 since irradiating area A1 does not influence irradiating area A3.

Figure 7:
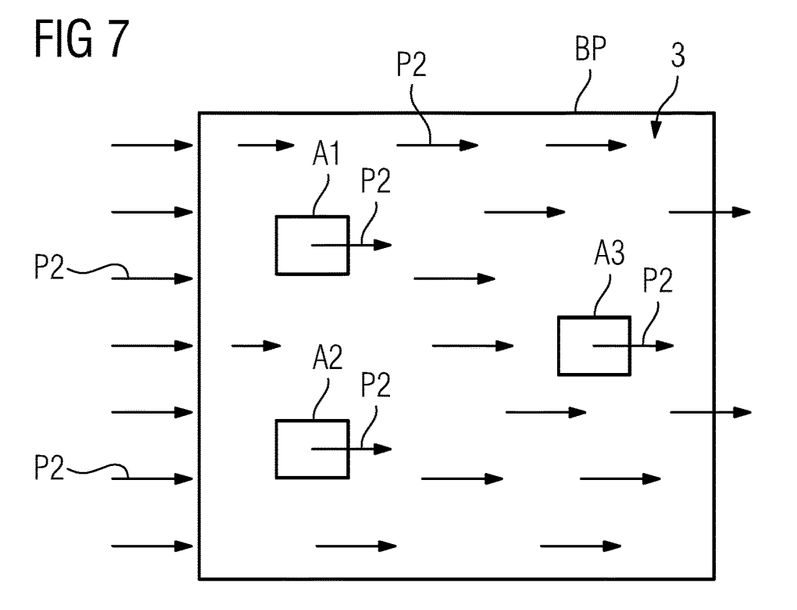

The exemplary arrangement of areas A1-A3 which are to be irradiated and consolidated according to FIG. 7 can result in a simultaneous irradiation of all areas A1-A3 since irradiating one of the areas A1-A3 does not influence any other area A1-A3.

The invention claimed is:

1. A method for additively manufacturing at least one three-dimensional object, the method comprising:
   selectively irradiating and consolidating at least one layer of build material, wherein the at least one layer of build material comprises a first area to be irradiated and consolidated, and at least one further area to be irradiated and consolidated; and,
   streaming a process gas stream capable of being charged with fume particles generated during selectively irradiating and consolidating the at least one layer of build material;
   wherein, a start time for selectively irradiating and consolidating for the first area and/or for selectively irradiating and consolidating for the at least one further area is determined at least in part on whether streaming of the process gas stream has fulfilled a pre-defined scheduling criterion, the pre-defined scheduling criterion comprising a time criterion or a local criterion.

2. The method of claim 1, wherein the scheduling criterion comprises a time criterion.

3. The method of claim 2, wherein the start time is determined at least in part on a charge time comprising a time required to charge the process gas stream with fume particles generated during selectively irradiating and consolidating the first area and/or the second area.

4. The method of claim 2, wherein the time criterion is determined at least in part on a transport time comprising a time required for the process gas stream to transport the fume particles to a specific area in a process chamber.

5. The method of claim 2, wherein the time criterion is determined at least in part on a transport time comprising a time required for the process gas stream to transport the fume particles from the first area across the at least one further area.

6. The method of claim 2, wherein the time criterion is determined at least in part on a transport time comprising a time required for the process gas stream to transport the fume particles out of a process chamber.

7. The method of claim 1, wherein the scheduling criterion comprises a local criterion.

8. The method of claim 7, wherein the local criterion is fulfilled when the process gas stream has crossed a specific area in a process chamber.

9. The method of claim 8, wherein the specific area comprises an area located downstream in the transport direction of the process gas stream relative to the at least one further area to be irradiated and consolidated.

10. The method of claim 1, wherein the start time for selectively irradiating and consolidating for the at least one further area comprises a minimum time interval after starting irradiating and consolidating for the first area.

11. The method of claim 1, further comprising determining whether a spatial relation of the first area and the at least one further area causes the process gas stream to transport fume particles from the first area across the at least one further area.

12. An apparatus for additively manufacturing at least one three-dimensional object, the apparatus comprising a control unit configured to implement a method for controlling the apparatus comprising:
   selectively irradiating and consolidating at least one layer of build material with at least one energy beam generated by an irradiation unit of the apparatus, wherein the at least one layer of build material comprises a first area to be irradiated and consolidated, and at least one further area to be irradiated and consolidated; and,
   streaming a process gas stream capable of being charged with fume particles generated during selectively irradiating and consolidating the at least one layer of build material from an inlet to an outlet of the apparatus;
   wherein, a start time for selectively irradiating and consolidating for the first area and/or for selectively irradiating and consolidating for the at least one further area is determined via the control unit based at least in part on whether streaming of the process gas stream has fulfilled a pre-defined scheduling criterion, the pre-defined scheduling criterion comprising a time criterion or a local criterion.

13. The apparatus of claim 12, wherein the scheduling criterion comprises a time criterion.

14. The apparatus of claim 13, wherein the start time is determined at least in part on a charge time comprising a time required to charge the process gas stream with fume particles generated during selectively irradiating and consolidating the first area and/or the second area.

15. The apparatus of claim 13 wherein the time criterion is determined at least in part on a transport time comprising a time required for the process gas stream to transport the fume particles to a specific area in a process chamber.

16. The apparatus of claim 13, wherein the time criterion is determined at least in part on a transport time comprising a time required for the process gas stream to transport the fume particles from the first area across the at least one further area.

17. The apparatus of claim 12, wherein the scheduling criterion comprises a local criterion.

18. The apparatus of claim 17, wherein the local criterion is fulfilled when the process gas stream has crossed a specific area in a process chamber.

19. The apparatus of claim 12, wherein the start time for selectively irradiating and consolidating for the at least one further area comprises a minimum time interval after starting irradiating and consolidating for the first area.

20. The apparatus of claim 12, wherein the method further comprises determining whether a spatial relation of the first area and the at least one further area causes the process gas stream to transport fume particles from the first area across the at least one further area.

* * * * *